United States Patent
Lobson

(10) Patent No.: US 7,833,460 B2
(45) Date of Patent: Nov. 16, 2010

(54) ROTATIONAL MOLDING METHOD

(76) Inventor: Craig Lobson, 47 Milner Street, Winnipeg, MB (CA) R2X 2P7

( * ) Notice: Subject to any disclaimer, the term of this patent is extended or adjusted under 35 U.S.C. 154(b) by 135 days.

(21) Appl. No.: 12/398,500

(22) Filed: Mar. 5, 2009

(65) Prior Publication Data

US 2009/0224424 A1 Sep. 10, 2009

Related U.S. Application Data

(60) Provisional application No. 61/034,205, filed on Mar. 6, 2008.

(51) Int. Cl.
*B29C 41/06* (2006.01)

(52) U.S. Cl. .................. 264/310; 264/311; 264/327
(58) Field of Classification Search ............ 264/310, 264/311, 327; 425/425, 429, DIG. 812
See application file for complete search history.

(56) References Cited

U.S. PATENT DOCUMENTS

| 6,726,864 B2 * | 4/2004 | Nasr et al. ............ 264/46.4 |
| 2007/0158629 A1 * | 7/2007 | Laws et al. ............ 256/24 |

OTHER PUBLICATIONS

Nugent, Rotational Molding: A Practical Guide, 2001, available from www.paulnugent.com, USA, pp. 320, 508-519.*

* cited by examiner

*Primary Examiner*—Joseph S Del Sole
*Assistant Examiner*—James Sanders
(74) *Attorney, Agent, or Firm*—Ryan W. Dupuis; Kyle R. Satterthwaite; Ade & Company Inc.

(57) ABSTRACT

A plurality of molded parts are rotationally molded by providing a common mold with plurality of molding chambers, each arranged for forming a respective one of the molded parts therein. The molding chambers are joined with one another by vent gates communicating gases between the molding chambers such that some of the molding chambers are vented directly to a surrounding exterior through an exterior vent and other ones of the molding chambers are vented to the exterior via the vent gates. The molded parts can be separated from one another after being released from the molding chambers of the mold.

20 Claims, 4 Drawing Sheets

ROTATIONAL MOLDING METHOD

This application claims the benefit under 35 U.S.C. 119(e) of U.S. provisional application Ser. No. 61/034,205, filed Mar. 6, 2008.

FIELD OF THE INVENTION

The present invention relates to a method of rotational molding and the use of a mold in which a plurality of molded parts are commonly vented during molding.

BACKGROUND

Typically to rotationally mold a hollow plastic article, a mold that defines the shape of the part to be produced is mounted on the arm of a molding machine. The machine is typically capable of biaxially rotating and moving the mold through the four phases of the process. A predetermined amount of plastic material, in the form of a liquid or a powder, is then placed in the mold's cavity. The machine then simultaneously rotates the mold in two directions and moves the mold into a heating chamber or oven. In the oven, the mold becomes hot and all the plastic material adheres to and sinters onto the inside surface of the cavity. While it continues to rotate, the machine moves the mold out of the heating chamber and into a cooling chamber, where the plastic is cooled to the point that the formed plastic part will retain its shape. The machine then moves the mold to an open station, and the mold stops rotating. The mold can then be opened and the molded part removed. The mold is then recharged with plastic material and the process can be repeated.

In rotational molding, a vent is typically required in communication with various parts of the mold in the form of a tube inserted into the mold to relieve pressure in the mold during the heating cycle and to reduce the negative pressure in the mold during the cooling cycle. Improper venting can result in a blow hole in the form of a void through the molded part due to plugged or improperly sized vents for example.

Due to the many number of vents typically required when molding multiple components, there is increased potential for at least one of the vents to become plugged resulting in blow holes being formed or other potential defects. Inserting the many vents is also time consuming and involves considerable wasted material in the area of each vent.

SUMMARY OF THE INVENTION

According to one aspect of the invention there is provided a method of rotational molding a plurality of molded parts, the method comprising:

providing a plurality of molding chambers, each arranged for forming a respective one of the molded parts therein;

joining the molding chambers with one another with vent gates, the vent gates each comprising a passage arranged such that the vent gates communicate gases between the molding chambers;

placing a starting material into the molding chambers;

heating and rotating the molding chambers such that the starting material forms the plurality of molded parts on walls of the molding chambers respectively;

venting at least one of the molding chambers directly to a surrounding exterior through an exterior vent;

venting other ones of the molding chambers via the vent gates through said at least one of the molding chambers to the surrounding exterior;

cooling the material forming the plurality of molded parts; and releasing the plurality of molded parts from the molding chambers respectively.

By providing vent gates between multiple molded parts, many chambers can be commonly vented through a single exterior vent which: i) is easier to maintain free of plugging; ii) allows material flow between separate parts to be formed; and iii) permits the molding of multiple parts with minimal waste material while saving time due to the minimum number of external vents required to be installed.

Preferably the method includes suitably sizing a cross sectional area of the vent gates to prevent bridging in the vent gate by arranging cross sectional dimensions of the vent gates to be equal to or greater than approximately 4 times a thickness of walls of the molded parts.

The method may further include removing material formed about an area of the vent gates from each molded part when the molded parts are separated from one another.

The plurality of molded parts are preferably substantially identical to one another.

The plurality of the molding chambers may be connected in series with one another with the vent gates and/or in parallel with one another with the vent gates.

The starting material preferably comprises a plurality of plastic powders varying in colour and density relative to one another.

The starting material may be placed in each one of the molding chambers.

Alternatively, the starting material may be placed in only some of the molding chambers prior to heating and rotating the molding chambers. In this instance the vent gates are arranged to allow a flow of the starting material between some of the molding chambers through the vent gates during heating and rotating.

The molded parts are preferably at least partially separated from one another after being released from the mold. In some instances a connecting portion remains between adjacent molded parts to assist in placement of the molded parts when used as repeating facade elements. Alternatively, the molded parts may be fully separated from one another for independent placement on an upright supporting surface as facade elements, or other alternative applications.

The plurality of molding chambers are preferably formed in a common mold assembly.

The method may further include insulating about the common mold assembly at the vent gates prior to heating and rotating the molding chambers.

Preferably the molding chamber which is vented directly to an exterior vent comprises one of the molding chambers located centrally in the common mold relative to the other molding chambers.

When the plurality of molded parts comprise facade elements arranged to form a facade on an upright supporting surface of a building and wherein each of the facade elements comprises a flat mounting side arranged to be mounted in abutment to the upright supporting surface and an opposing decorative side which is generally domed outwardly relative to the flat mounting side and which is irregular in profile, the method may comprise communicating the vent gates between walls of the molding chambers corresponding to the flat mounting sides of the molded parts.

The method may further include locating the molding chambers relative to one another such that flat walls of the molding chambers corresponding to the flat mounting sides of the respective molded parts are oriented in a generally common plane and face in a generally common direction and arranging each of the vent gates to comprise a generally U-shaped passage communicating between the flat mounting sides of adjacent ones of the molding chambers.

Alternatively the method may include arranging some of the vent gates to comprise a generally S-shaped passage communicating between the flat mounting sides of adjacent ones of the molding chambers having flat walls facing in opposing directions.

The method may further comprise providing an auxiliary passage in communication with the flat wall of some of the molding chambers at locations which are generally diametrically opposite communication of the vent gates with the flat wall.

When communicating each of the vent gates between the flat mounting sides of adjacent ones of the molding chambers, the method may further comprise partially separating the vent gates from the molded parts such that a connection portion of molded material remains in connection between adjacent ones of the molded parts which lies generally in the common plane with the flat mounting sides of the molded parts.

When forming the common mold, preferably connecting portions are provided between adjacent ones of the molding chambers so as to be arranged to form the respective connecting portions of molded material in connection between adjacent ones of the molded parts in which the connecting portions each span a distance between adjacent ones of the molding chambers which corresponds to the grout space between adjacent facade elements on the upright supporting surface.

Some embodiments of the invention will now be described in conjunction with the accompanying drawings in which:

BRIEF DESCRIPTION OF THE DRAWINGS

In the drawings, like characters of reference indicate corresponding parts in the different figures.

DETAILED DESCRIPTION

Figure 1:
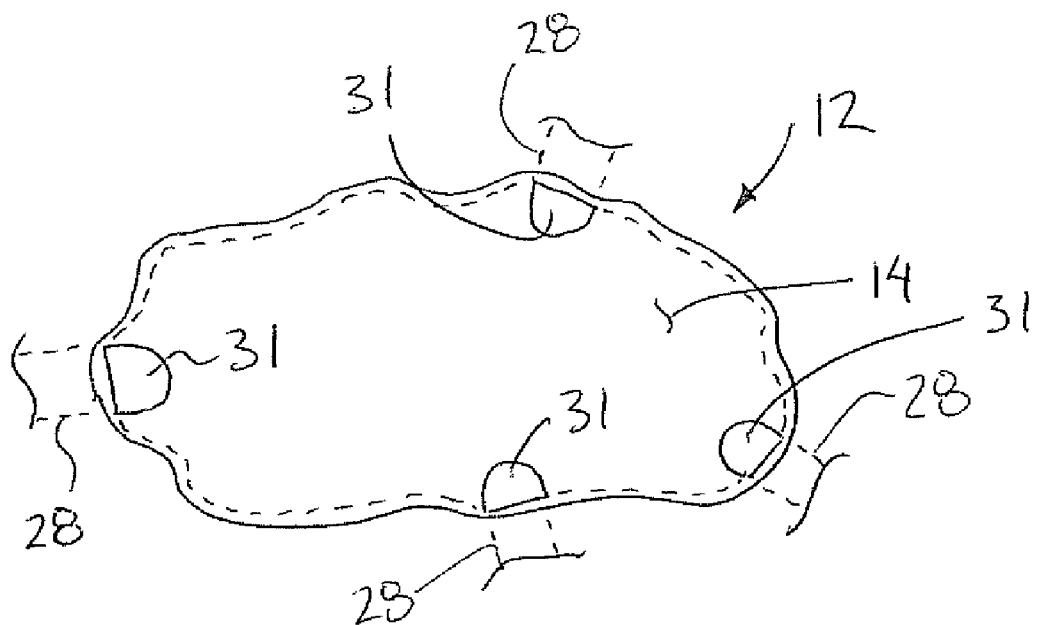
FIG. 1 is bottom plan view of a molded part formed according to the method and mold described herein.
Figure 2:
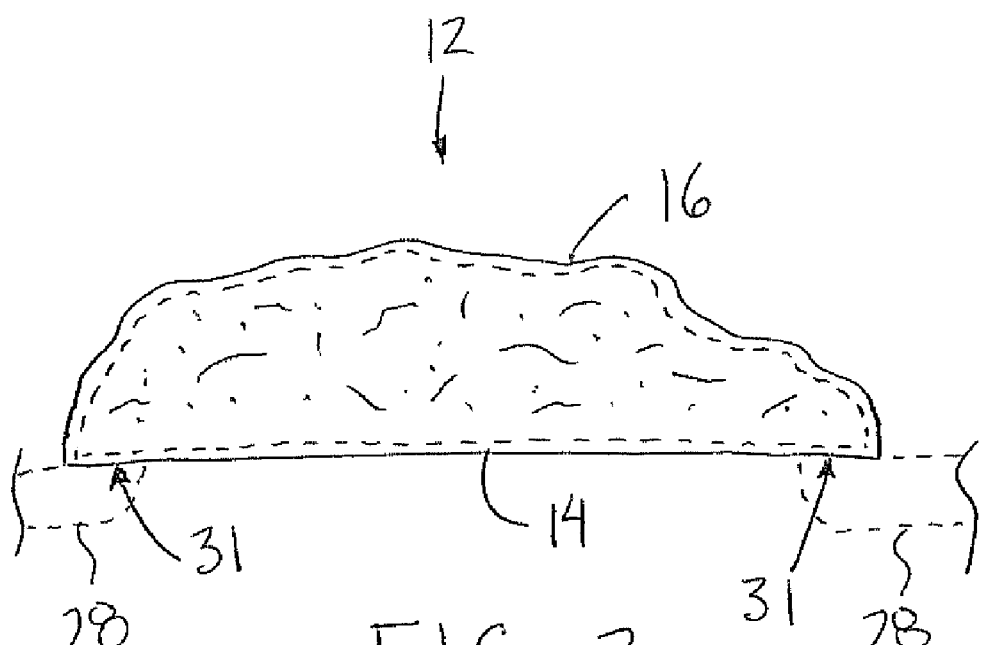
FIG. 2 is a side elevational view of the part according to FIG. 1.

Referring to the accompanying figures there is illustrated a rotational molding mold generally indicated by reference numeral 10. The mold 10 is particularly suited for commonly venting a plurality of parts 12 formed by a rotational molding process.

The molded parts 12 according to the illustrated embodiment each comprise a hollow plastic member resembling a stone or rock which is suitably shaped and sized for mounting as a decorative building façade. Each part 12 includes a flat rear side 14 and a generally domed front side 16. The rear side is suitably arranged for mounting flat against a supporting surface to be decorated with a building façade. The front side is irregular in profile and generally domed in shape to resemble a natural stone.

Although various embodiments of the mold 10 are described and illustrated in the accompanying specification, the common features of each will first be described.

In each instance the mold comprises a plurality of molding chambers 20 comprising walls 22 which surround a hollow interior 24 of the mold. The walls 22 are suitably shaped to form and define the exterior shape of the respective molded part 12 formed by the respective chamber 20. The walls 22 of the chamber are formed in sections to be releasable from one another to release the formed part 12 from the mold subsequent to the molding operation in a manner which is conventional to typical rotational molding processes. One of the walls 22 of each chamber comprises a flat wall for forming the flat rear mounting side 14 of the respective molded part.

The mold 10 comprises a common assembly forming the plurality of molding chambers 20 for forming the respective parts 12 therein.

Only some of the chambers 20 of the common molding assembly include an external vent tube 26 in communication therewith. The external vent tube 26 comprises a passage in communication between the hollow interior of the respective chamber and a surrounding exterior environment for venting gases therethrough. The chambers 20 in communication directly with an external vent tube 26 are centrally located relative to the other molding chambers in the common mold assembly. Suitable material or mechanisms maybe placed in the vent tube 26 to prevent leakage of plastic material therethrough and to prevent plugging during the rotational molding process.

All of the chambers 20 are connected to at least one other chamber by a vent gate 28 which forms a portion of the overall common mold assembly. Each vent gate 28 comprises a generally tubular passage which is open at opposed ends and enclosed between the open ends to define a channel in communication between the hollow interior of two respective chambers 20 for communicating gases between the chambers including the escape of hot gases generated during the heating and forming phase of the rotational molding and to allow gases to be drawn back into the hollow interior during the cooling phase.

The cross section of the passage forming each vent gate 28 is large enough to prevent bridging of the forming material therein while being sufficiently small to prevent excessive waste of material and to prevent a weakening of the finished part. The cross sectional dimensions of the vent gates are typically approximately 4 times a thickness of the walls of the finished part or greater. An exemplary cross section of the passage forming each vent gate may be in the range of one to three square centimetres, but will depend upon the molded part thickness. When the molded parts 12 being formed in each chamber 20 include a flat rear mounting side and an opposing decorative front side as shown in FIG. 1, the vent gates 28 are arranged to communicate between respective flat walls of the chambers corresponding to the forming of the flat rear mounting sides.

In use, a starting material 30, for example comprising plastic powder or raw liquid plastic, is deposited either in some or all of the chambers 20 of the mold. When placing starting material in only some of the chambers, the vent gates 28 communicating between the chambers are preferably sufficiently large in cross section to readily allow the flow of plastic materials between adjacent chamber therethrough.

The same type of starting material 30 may be placed in each of the chambers 20, or alternatively a different composition of starting material 30 can be placed in some of the chambers 20 relative to other ones of the chambers. Different materials may comprise differences in colour for instance so that the various parts within a common mold maybe different in colour or different in some other configuration relative to one another. In preferred embodiments, the starting material 30 comprises powders which differ in colour and density from one another to affect the appearance of the finished part. For example denser powder typically migrate more towards the outer periphery of the mold relative to the axes of rotation of the mold as compared to less dense powder and will accordingly be more visible at the surface in the finished molded part as compared to the less dense powders.

Once the starting material 30 has been placed in the chambers 20 and the mold fully enclosed, with the exception of the external vent tubes 26 which remain open, the mold 10 is heated and rotated about several axes of rotation so that the starting material 30 coats the interior of all of the walls 22 of the chambers 20. The mold is then subsequently cooled and released from the molded parts 12 formed therein. Once the parts are released from the molds, the parts 12 are further separated from one another by separating the material formed at the vent gates 28 between adjacent ones of the parts 12.

If it is desired to minimize waste of material deposited at the vent gates of the mold, the external surfaces of the common mold assembly can be insulated about the vent gates so that less plastic powder material will be deposited on the interior surfaces of the mold assembly at the vent gates during heating and rotation of the mold assembly.

Figure 4:
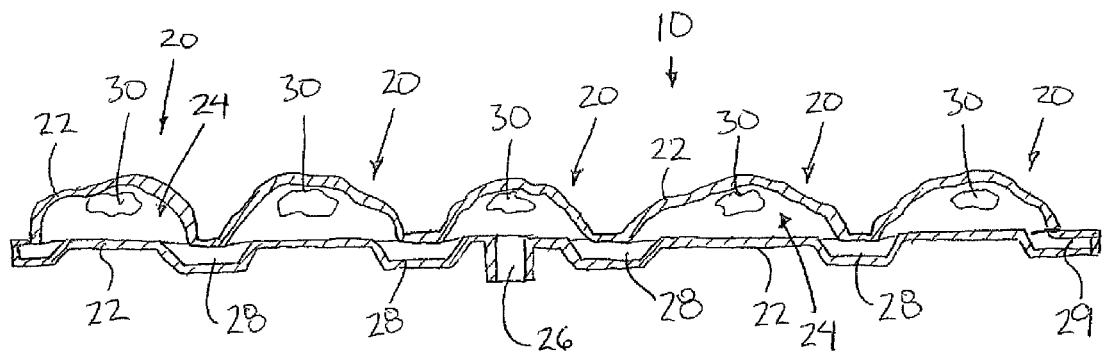
FIG. 4 is a cross-sectional view along the line 4-4 of FIG. 3.
Figure 5:
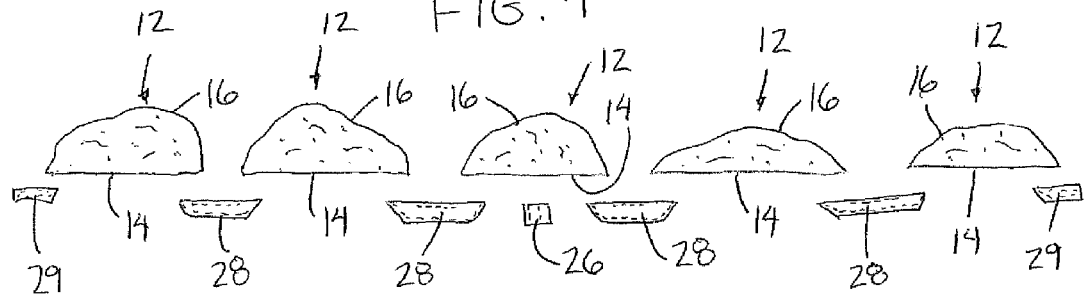
FIG. 5 is a side elevational view of the parts formed by the mold according to FIGS. 3 and 4 after separation from one another.
Figure 3:
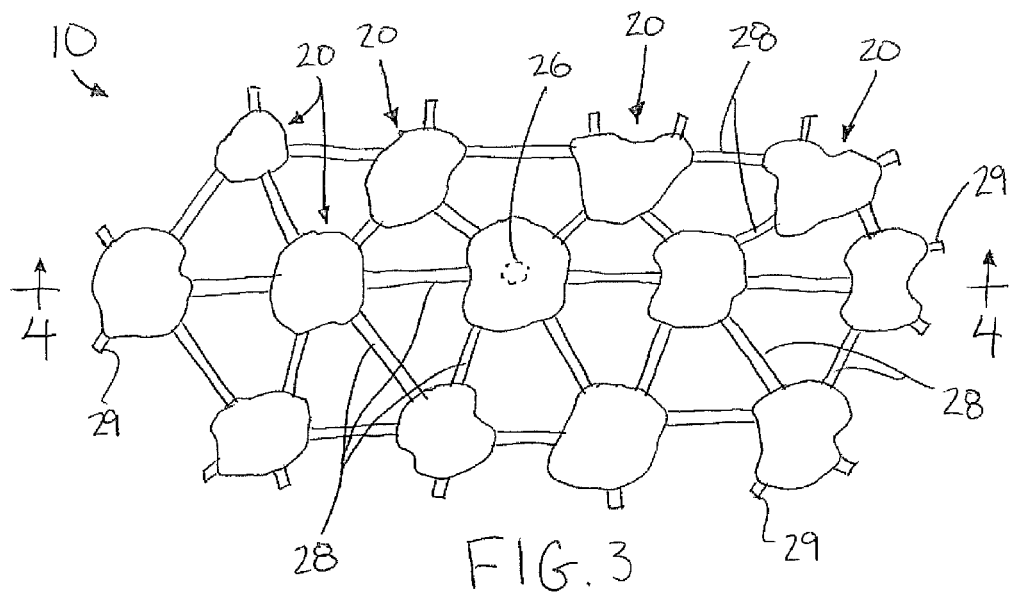
FIG. 3 is a top plan view of a first embodiment of the mold.

Turning now more particularly to FIGS. 3 through 5, according to a first embodiment of the mold assembly, a plurality of the chambers 20 are shown connected with one another by vent gates 28 in communication between adjacent ones of the chambers. As best shown in FIG. 3, each chamber 20 communicates through vent gates 28 with at least two other chambers 20 such that the chambers are connected in communication with one another both in series and in parallel.

One or more centrally located ones of the molding chambers 20 communicates directly with the external vent tube 26 to be vented directly to the exterior. To minimize the wasted material at the vent gates 28, the chambers 20 are oriented with the flat rear mounting sides of each chamber lying generally in a single common plane and with the flat rear mounting sides of each chamber facing in a common first direction. In this instance each vent gate 28 is a generally U-shaped passage communicating between the flat side of one of the chambers and the flat side of another one of the chambers in the common plane. One wall of each vent gate 28 lies generally flush in the common plane of the flat rear mounting sides, however all of the vent gates 28 are located on one side of the common plane opposite all of the molding chambers 20 which are located on the other side of the common plane.

Providing a plurality of external vent tubes 26 in communication with respective different ones of the molding chambers, and connecting each molding chamber with at least two other chambers through vent gates 28, ensures continued external venting of the entire set of molding chambers 20 even if a blockage occurs either in one of the vent gates 28 or in one of the external vent tubes 26.

As shown in FIG. 5, upon completion of molding of a common molded member comprising the plurality of molded parts integrally molded with one another, the molded parts are separated from one another by a shearing or cutting operation to remove the material at the vent gates 28 from the flat mounting sides of the molded parts along a cutting plane in common with the flat mounting sides of the parts. Accordingly, apertures 31 are defined in the mounting side of each part which correspond to each vent gate 28 in communication therewith during the molding operation.

When the molded parts comprise products intended for outdoor applications where it is undesirable for water to collect in the hollow interior thereof, auxiliary passages 29 are formed in the mold in communication with the flat wall thereof at locations which are generally diametrically opposite communication of vent gates 28 with the flat wall. The resulting auxiliary passage 29 formed in the molded part is sheared off with the vent gates 28 to leave an aperture remaining in the flat mounting side of the finished part opposite apertures formed by the vent gates.

Figure 6:
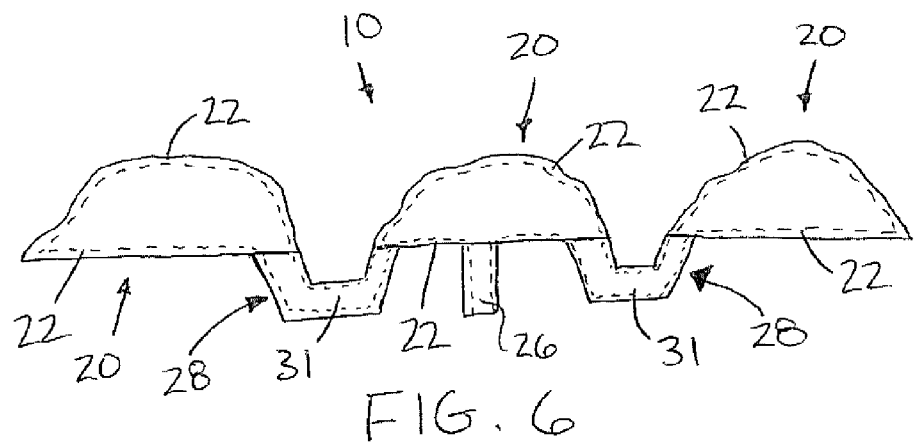
FIG. 6 is an elevational view of a second embodiment of the mold.

Turning now to FIG. 6, a plurality of chambers are again shown in series with one another, and with all of the flat sides of molding chambers 20 being mounted in a generally common plane to face the same direction. In this instance each of the vent gates 28 also comprises a generally U-shaped passage communicating between the flat sides of two different chambers, however the vent gates are arranged to each have a main portion 31 spanning between respective chambers 20 which is spaced outwardly in relation to the common plane of the flat sides of the molding chambers on the opposing side of the common plane as the molding chambers 20. In this manner, the vent gates all project away from the common plane of the flat sides of the molding chambers opposite the molding chambers such that the material deposited in the vent gates of the mold is more readily sheared from the molded parts formed in the respective molding chambers 20 after the molding operation is complete.

Figure 7:
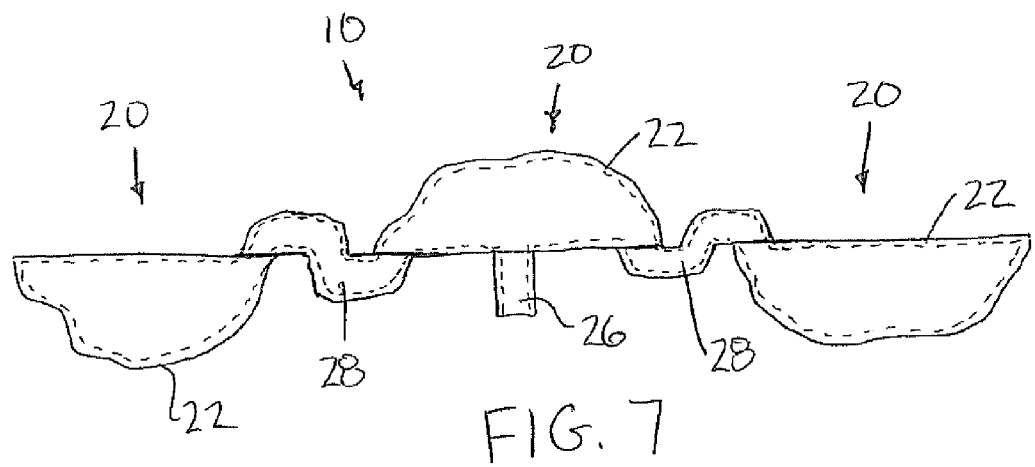
FIG. 7 is an elevational view of a further embodiment of the mold.

As shown in FIG. 7, according to a further embodiment of the present invention, the flat walls of the molding chambers for forming the flat mounting sides of the molded parts are located in a generally common plane, but some of the flat walls face in a first direction away from the common plane and some of the flat walls face in a second direction away from the common plane, opposite to the first direction. In this instance, each vent gate communicates between flat mounting sides of adjacent ones of the molding chambers having flat walls facing in opposing directions. Accordingly, the vent gates in this instance each comprise a generally S-shaped passage communicating between the flat mounting sides of the adjacent ones of the molding chambers. The material deposited at the vent gates 28 is again sheared from the respective molding chambers 20 along a cutting plane flush with the flat mounting side of the molded part to define an aperture in the flat mounting side of the finished part once the vent gate material is removed.

Figure 8:
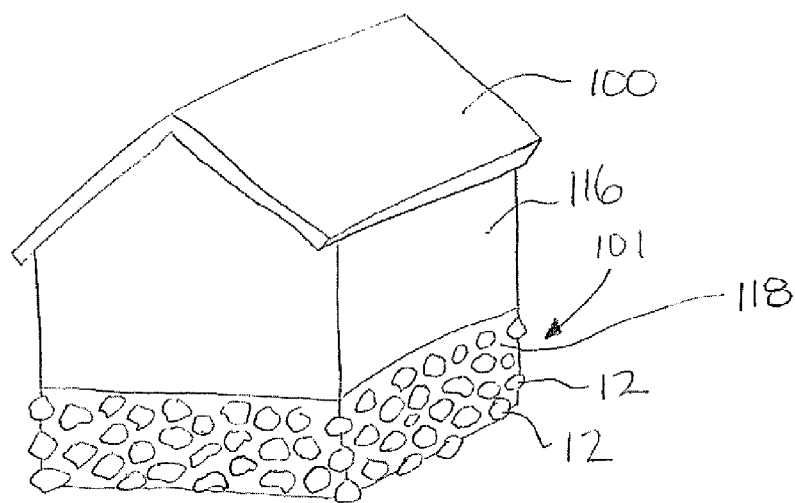
FIG. 8 is a perspective view of a building upon which the molded parts are supported when the molded parts comprise facade elements.
Figure 9:
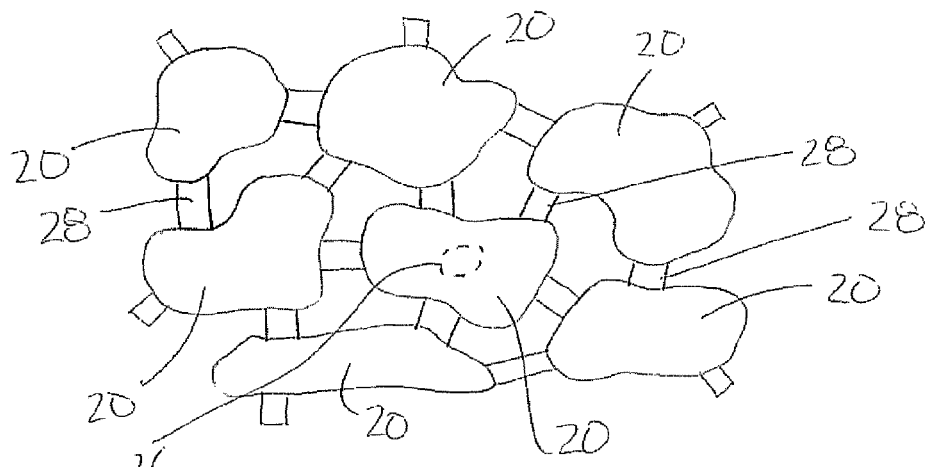
FIG. 9 is a plan view of a further embodiment of the mold for forming facade elements.

In a preferred embodiment shown in FIG. 8, the molded parts 12 comprise facade element for mounting on the upright supporting surface of a building 100. Each facade element 12 is used in cooperation with a plurality of other elements of similar configuration to form the building facade 101 which imitates and closely resembles the appearance of a natural stone or brick foundation set in mortar, but with low cost plastic material which can be installed without any skilled workers, for example masons, being required. Though various embodiments of the elements are described and illustrated in the following, the common feature of each will first be described herein.

In each instance the element 12 includes a body formed of plastic material, for example polyethylene, which is formed to include a substantially flat rear side and a decorative front side which is textured and which protrudes outwardly from a rear plane of the flat rear side. The plastic is formed so as to have sufficient strength to be rigid and self-supporting, yet will have sufficient resilience to prevent cracking when pierced with nails and the like during mounting of the elements on an upright supporting surface 116. The flat rear side is to be configured to mount to the upright supporting surface 116 directly in abutment therewith.

Each element 12 is formed to be a hollow member in which the flat rear side and the decorative front side, which protrudes from the rear side, are integrally formed together to fully surround and enclose the hollow interior between the front and rear sides. The front side joins the rear side about a periphery of the rear side generally in a common plane therewith so that the front side, which is textured to resemble a stone in appearance, is domed outwardly relative to the rear side.

In the preferred method of forming the elements, the front and rear sides are integrally formed by rotational molding in a common mold with other elements as described above in FIGS. 1 through 7. As illustrated the rotational mold for molding the elements comprises a rear mold portion for forming the flat rear side of each element and a front portion which forms the front side of the element. The two mold portions are joined together at a seam lying generally in a common plane with the rear side of the element being formed. Accordingly the seam which may be visible on the molded element is hidden from view directly against the supporting surface upon which the element is mounted to be covered by grout so as not to be visible in the finished façade of elements.

The vents are communicated through the rear mold portion and accordingly through the rear side of the element being formed so that a plurality of the vents are provided in communication with each element both centrally and about a periphery of the element. When locating vent apertures formed in the rear side of the element adjacent the outer periphery of the rear side, at least one of the vent apertures can be located adjacent the bottom side of the element in the mounted position when the rear side is mounted in an upright orientation on the supporting surface. This configuration allows for drainage of any water collected therein and to ventilate any moisture trapped within the hollow interior of the element or trapped against the supporting surface against which the element is supported.

The strength of the material forming the elements is typically selected to be softer than the supporting surface against which the elements are mounted such that there is more resistance to penetration of nails into the supporting surface than through the material of the front and rear sides of the element. In this manner nails can be driven through the front and rear sides of the element using a suitable air driven nailer with the nails only being able to be partly penetrated into the supporting surface beneath the elements so as to remain engaged at least partway through the element in the mounted position thereof.

When mounting on the building, the flat rear panel is substantially abutted against the upright supporting surface by placing the rear side directly against and in contact with the supporting surface. Nails are used to secure the element in place. As described above, using an air driven nailer, nails are inserted at the front side so as to be driven fully through the front side then remain imbedded through the flat rear panel at the rear and the supporting surface 116 for gripping the flat rear panel to the supporting surface. An air pressure control may be used to control the air pressure and thus the depth of penetration of the nails through the elements and into the supporting surface. Additional elements are mounted in a similar manner in spaced apart relation with one another on the upright supporting surface by a grout space between adjacent ones of the elements. A grouting material 118 is then used to fill the gaps between adjacent elements so as to span the grout space between the adjacent elements. The grouting material typically comprises a conventional mortar or a caulking material, for example a mortar repair material or compound which is dispensed from a caulking tube.

When the molded parts 12 are intended to be used as façade elements as shown in FIG. 8, a plurality of the molded parts may remain partially connected to one another to simplify the positioning of the elements 12 relative to one another on the upright supporting surface of the building. In this instance the common mold for the plurality of molded parts 12 is arranged similarly to the configuration of FIG. 4 in which the rear walls of each of the mold chambers are located in a generally common plane so that the mold chambers protrude in a common direction from the common plane to respective opposing front walls forming the front sides of the façade elements. The molding chambers 20 are spaced apart from one another in the direction of the common plane so that each molding chamber is spaced apart from adjacent molding chambers by a prescribed grout space which corresponds to the desired spacing between façade elements 12 supported on the wall where grout material 118 is arranged to be received.

The vent gates 28 are also arranged similarly to the configuration of FIG. 4 such that the vent gates communicate between the flat mounting sides of adjacent ones of the molding chambers with one wall of each vent gate lying generally in the common plane of the flat rear sides while the remaining portion of the vent gate protrudes from the common plane in an opposing direction from the molding chambers 20.

Figure 10:
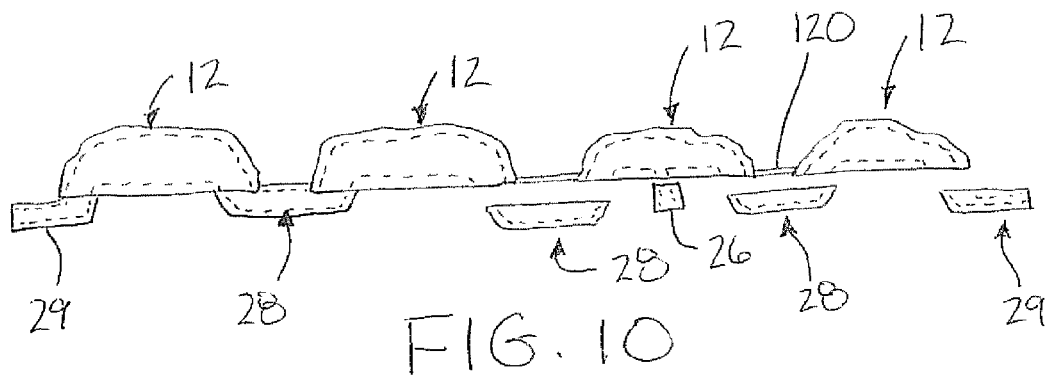
FIG. 10 is an end elevational view of the molded parts shown separated from the mold of FIG. 9 in which some of the molded parts are shown partially separated from one another by removing a portion of the molded material forming the vent gates.
Figure 11:
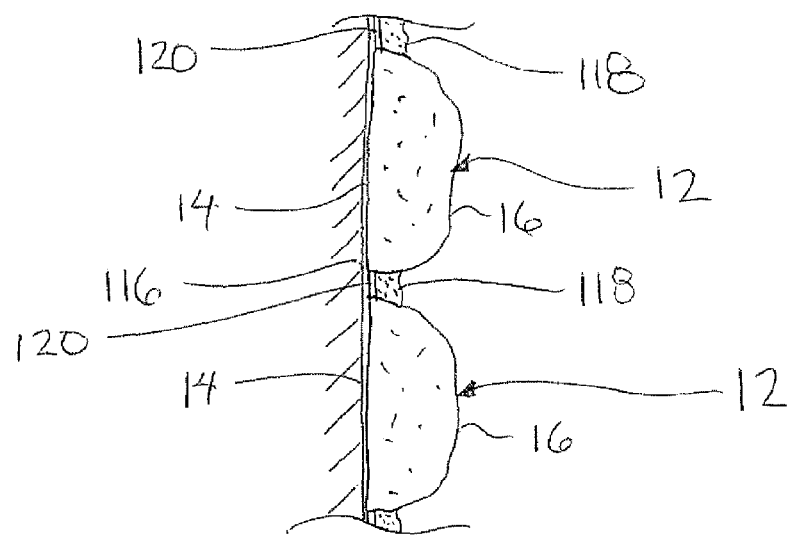
FIG. 11 is a partly sectional side elevational view of the molded parts supported as facade elements on an upright supporting of a building in which the molded parts are shown connected by connecting portions which support the molded parts at a prescribed grout spacing from one another.

After the molding operation is complete and the molded parts are removed from the common mold, the vent gates are partially separated from the molded parts such that the molded parts are only partially separated from one another instead of being fully separated from one another in the embodiment of FIGS. 4 and 5. More particularly the portion of molded material formed by the vent gates which does not lie in the common plane of the flat rear sides of the molded parts is removed such that a connection portion 120 remains connected between each molded part and the adjacent ones of the molded parts in the common mold. One wall of each vent gate thus defines a connecting portion of the mold upon which the connecting portions 120 of molded material are formed for connecting between adjacent ones of the molded parts. In this instance each of the vent gates is arranged to span between adjacent ones of the molding chambers by a distance corresponding to the prescribed grout space so that resulting molded parts are spaced apart by the prescribed grout space. As shown in FIG. 10, a portion of the molded material formed by some of the vent gates 28 is already removed such that the connecting portion 120 remains while the material formed by one of the vent gates 28 is shown prior to separation from the molded parts 12.

After separation of the molded parts from the mold and the partial separation of some of the material formed by the vent gates from the molded parts so that the molded parts are partially separated from one another, the resulting interconnected molded parts held at a prescribed grout spacing relative to one another by the connecting portions 120 are supported on the upright supporting surface 116 of the building such that the flat rear sides and the connecting portions 120 which lie in a generally common plane are abutted flat against the supporting surface for fastening to the surface. Once fastened to the surface, the grout material 118 fills the grout space between adjacent ones of the façade elements 12.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A method of rotational molding a plurality of molded parts, the method comprising:
   providing a plurality of molding chambers, each arranged for forming a respective one of the molded parts therein;
   joining the molding chambers with one another with vent gates, the vent gates each comprising a passage arranged such that the vent gates communicate gases between the molding chambers;
   placing a starting material into the molding chambers;
   heating and rotating the molding chambers such that the starting material forms the plurality of molded parts on walls of the molding chambers respectively;
   venting at least one of the molding chambers directly to a surrounding exterior through an exterior vent;
   venting other ones of the molding chambers via the vent gates through said at least one of the molding chambers to the surrounding exterior;
   cooling the material forming the plurality of molded parts; and
   releasing the plurality of molded parts from the molding chambers respectively.

2. The method according to claim 1 including suitably sizing a cross sectional area of the vent gates to prevent bridging in the vent gate.

3. The method according to claim 2 including arranging cross sectional dimensions of the vent gates to be equal to or greater than approximately 4 times a thickness of walls of the molded parts.

4. The method according to claim 1 including removing material formed about an area of the vent gates from each molded part when the molded parts are separated from one another.

5. The method according to claim 1 wherein the plurality of molded parts are substantially identical to one another.

6. The method according to claim 1 including connecting a plurality of the molding chambers in series with one another with the vent gates.

7. The method according to claim 1 including connecting a plurality of the molding chambers in parallel with one another with the vent gates.

8. The method according to claim 1 wherein the starting material comprises a plurality of plastic powders varying in colour and density relative to one another.

9. The method according to claim 1 including placing the starting material in each one of the molding chambers.

10. The method according to claim 1 including placing the starting material in only some of the molding chambers prior to heating and rotating the molding chambers and arranging the vent gates to allow a flow of the starting material between some of the molding chambers through the vent gates during heating and rotating.

11. The method according to claim 1 including at least partially separating the plurality of molded parts from one another.

12. The method according to claim 1 including forming the plurality of molding chambers in a common mold assembly.

13. The method according to claim 12 including insulating about the common mold assembly at the vent gates prior to heating and rotating the molding chambers.

14. The method according to claim 1 including arranging said at least one molding chamber vented directly to an exterior vent to comprise one of the molding chambers located centrally relative to the other molding chambers.

15. The method according to claim 1 wherein the plurality of molded parts comprise facade elements arranged to form a facade on an upright supporting surface of a building and wherein each of the facade elements comprises a flat mounting side arranged to be mounted in abutment to the upright supporting surface and an opposing decorative side which is generally domed outwardly relative to the flat mounting side and which is irregular in profile, wherein the method comprises communicating the vent gates between walls of the molding chambers corresponding to the flat mounting sides of the molded parts.

16. The method according to claim 15 including:
   locating the molding chambers relative to one another such that flat walls of the molding chambers corresponding to the flat mounting sides of the respective molded parts are oriented in a generally common plane and face in a generally common direction; and
   arranging each of the vent gates to comprise a generally U-shaped passage communicating between the flat mounting sides of adjacent ones of the molding chambers.

17. The method according to claim 15 including:
   locating the molding chambers such that flat walls of the molding chambers corresponding to a flat mounting sides of the respective molded parts are oriented in a generally common plane in which some of the flat walls face in a first direction and some of the flat walls face in a second direction opposite to the first direction; and
   arranging some of the vent gates to comprise a generally S-shaped passage communicating between the flat mounting sides of adjacent ones of the molding chambers having flat walls facing in opposing directions.

18. The method according to claim 15 including providing an auxiliary passage in communication with the flat wall of some of the molding chambers at locations which are generally diametrically opposite communication of the vent gates with the flat wall.

19. The method according to claim 15 including:
   locating the molding chambers relative to one another such that flat walls of the molding chambers corresponding to the flat mounting sides of the respective molded parts are oriented in a generally common plane and face in a generally common direction;
   communicating each of the vent gates between the flat mounting sides of adjacent ones of the molding chambers; and
   partially separating the vent gates from the molded parts such that a connection portion of molded material remains in connection between adjacent ones of the molded parts which lies generally in the common plane with the flat mounting sides of the molded parts.

20. The method according to claim 15 wherein the facade elements are arranged to be supported on the upright supporting surface of the building with a grout space between adjacent ones of the facade elements so as to be arranged to receive grout material in the grout space and wherein the method includes:
   locating the molding chambers relative to one another such that flat walls of the molding chambers corresponding to the flat mounting sides of the respective molded parts are oriented in a generally common plane and face in a generally common direction; and
   communicating connecting portions of the molding chambers between adjacent ones of the molding chambers so as to be arranged to form respective connecting portions of molded material in connection between adjacent ones of the molded parts in which the connecting portions each span a distance between adjacent ones of the molding chambers which corresponds to the grout space.

* * * * *